(12) United States Patent
Kasperski (10) Patent No.: US 7,516,124 B2
(45) Date of Patent: *Apr. 7, 2009

(54) INTERACTIVE SEARCH ENGINE

(75) Inventor: Richard Kasperski, Creston (CA)

(73) Assignee: Yahoo! Inc., Sunnyvale, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 11/313,525

(22) Filed: Dec. 20, 2005

(65) Prior Publication Data

US 2007/0143262 A1    Jun. 21, 2007

(51) Int. Cl.
*G06F 17/30*    (2006.01)

(52) U.S. Cl. .......................................... 707/3
(58) Field of Classification Search ................ None
See application file for complete search history.

(56) References Cited

U.S. PATENT DOCUMENTS

| | | | | |
|---|---|---|---|---|
| 4,255,796 | A * | 3/1981 | Gabbe et al. .................. | 707/3 |
| 4,433,392 | A * | 2/1984 | Beaven .......................... | 707/6 |
| 5,278,980 | A * | 1/1994 | Pedersen et al. .............. | 707/4 |
| 5,845,278 | A | 12/1998 | Kirsch et al. | |
| 5,913,215 | A | 6/1999 | Rubenstein et al. | |
| 6,411,950 | B1 * | 6/2002 | Moricz et al. ................. | 707/3 |
| 6,772,150 | B1 * | 8/2004 | Whitman et al. .............. | 707/6 |
| 7,039,635 | B1 * | 5/2006 | Morgan et al. ................ | 707/4 |
| 7,181,438 | B1 * | 2/2007 | Szabo ............................ | 707/2 |
| 7,249,126 | B1 | 7/2007 | Ginsburg et al. | |

2003/0101172 A1    5/2003    De La Huerga (Continued)

FOREIGN PATENT DOCUMENTS

DE    102 35 548 A1    3/2002

(Continued)

OTHER PUBLICATIONS

The web site at http://www.google.com/webhp?complete=1&hl=en provides a field wherein a user may type a query and, for each character entered, a list of approximately 10 suggested queries are displayed that are each based on what has been typed so far.

(Continued)

*Primary Examiner*—Mohammad Ali
*Assistant Examiner*—Syed H Hasan
(74) *Attorney, Agent, or Firm*—Hickman Palermo Truong & Becker LLP; Daniel D. Ledesma (57) ABSTRACT

A method and apparatus for providing a highly interactive user interface to a search engine using user input prediction is disclosed. As the user enters a portion of a query in a query field, the portion of the query is sent over a network to a query predictor. The query predictor determines a set of one or more predicted queries that correspond to the portion of the query. A particular predicted query is selected from the set of predicted queries based on selection criteria. The particular predicted query is processed by a search engine to obtain search results. The set of predicted queries and the search results are sent to the user and displayed on the user interface. The user may choose a different predicted query in the set of predicted queries or continue entering characters, both of which may result in different search results being displayed.

26 Claims, 6 Drawing Sheets

U.S. PATENT DOCUMENTS

| | | |
|---|---|---|
| 2003/0195877 A1 | 10/2003 | Ford et al. |
| 2004/0021691 A1 | 2/2004 | Dostie et al. |
| 2005/0283468 A1* | 12/2005 | Kamvar et al. .................. 707/3 |
| 2006/0064411 A1 | 3/2006 | Gross et al. |
| 2006/0173822 A1 | 8/2006 | Watson et al. |
| 2006/0190436 A1* | 8/2006 | Richardson et al. ............ 707/3 |
| 2008/0077558 A1 | 3/2008 | Lawrence et al. |

FOREIGN PATENT DOCUMENTS

| | | |
|---|---|---|
| DE | 102 35 548 A1 | 10/2003 |
| EP | 0 530 993 A2 | 3/1993 |
| EP | 1 006 704 A2 | 6/2000 |
| EP | 1 031 913 A2 | 8/2000 |
| EP | 1 408 674 A2 | 4/2004 |
| WO | WO 99/66427 | 12/1999 |
| WO | WO 99/66427 A1 | 12/1999 |
| WO | WO 01/80070 A | 10/2001 |
| WO | WO 2004/073286 A | 8/2004 |
| WO | WO 2004/073286 A2 | 8/2004 |

OTHER PUBLICATIONS

PCT International Search Report and Written Opinion, PCT/US2006/031993, dated May 18, 2007, 10 pages.

PCT International Search Report and Written Opinion, PCT/US2006/032255, dated May 16, 2007, 11 pages.

PCT International Search Report and Written Opinion, PCT/US2006/032243, dated or/16/2007, 12 pages.

R. Baeza-Yates, et al., "Modern Information Retrieval, Chapter 5 Query Operations", Modern Information Retrieval, Harlow: Addison-Wesley, GB, 1999, pp. 117-139, XP0022311981, ISBN: 0-201-39829-X.

International Searching Authority, "Notification of Transmittal of The International Search Report and The Written Opinion of The International Searching Authority, or The Declaration", PCT/US2006/047543, dated May 30, 2007, 12 pages.

Claims, PCT/US2006/047543, 3 pages.

Yates, R et al., "Query Operations", XP-002311981, Chapter 5, 1999, pp. 117-139.

"Communication Pursuant to Article 94(3) EPC" received in European case 06801807.6 dated Jun. 6, 2008, 3 pages.

* cited by examiner

FIG. 4

INTERACTIVE SEARCH ENGINE

FIELD OF THE INVENTION

The present invention relates generally to search engines, and more particularly to providing an interactive user interface to a search engine using user input prediction.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Search engines are common and useful tools for searching the Internet for any type of information that is web accessible. They respond to user queries by generating a list of links to documents deemed relevant to the query. Search engines are also used in proprietary websites to search for information specifically pertaining to the proprietary websites.

However, search engines perform all their work for a user only after the user has entered a query into a query field and issued the query by clicking "Search," "Enter," or "Go." This traditional approach is intuitive because the only time a search engine "knows" for certain what a user desires is when the user decides that the query is correct and complete by formally issuing the query. Thus, search engines do not provide help to the user while the user is formulating a query. Accordingly, search engines must "wait" to provide the search results until the user has determined that the query is complete, at which time the user explicitly issues the query to a search engine. As a logical extension, any additional information relating to the query and search results is provided after the user issues the query.

Furthermore, the manner in which the user issues subsequent queries is relatively time consuming. If the user is dissatisfied with the search results of a particular query, the user must reformulate a subsequent query and then issue that query. Again, the search engine does not provide any assistance or search results until after the subsequent query is issued.

Based on the foregoing, there is a need for search engines to be more responsive and proactive in assisting users with the queries they formulate before the user formally issues a full and complete query.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided for providing an interface to a search engine. An interface to a search engine assists the user 1) by predicting what the user is searching for based on the character or characters the user has entered so far in the query field of the interface, and 2) by providing search results to the user via the interface without the user having to formally issue the intended query. For each character entered into the query field, that portion of the query entered so far is automatically issued to a query predictor that determines a set of one or more predicted queries that correspond to the portion of the query. The set of predicted queries is determined based on the frequency of previously issued queries alone or also on when the previous queries were issued. The most likely predicted query is processed by a search engine to obtain search results. Both the predicted queries and the search results are provided to the user via the interactive user interface. The predicted queries, when displayed to the user, may be ordered based on their popularity (frequency-based) alone or also on their temporal relevance (time-based).

If the user is not interested in the search results based on the most likely predicted query, the user may select any query in the set of predicted queries. When the user selects a different predicted query in the list, the search results are then updated to display the search results that pertain to the different predicted query.

In addition to displaying the predicted queries and search results to the user via the user interface, other dynamic data may be provided that relate to the most likely predicted query but are not necessarily obtained by the search results, such as advertisements and other related links to websites.

Functional Overview

Figure 1:
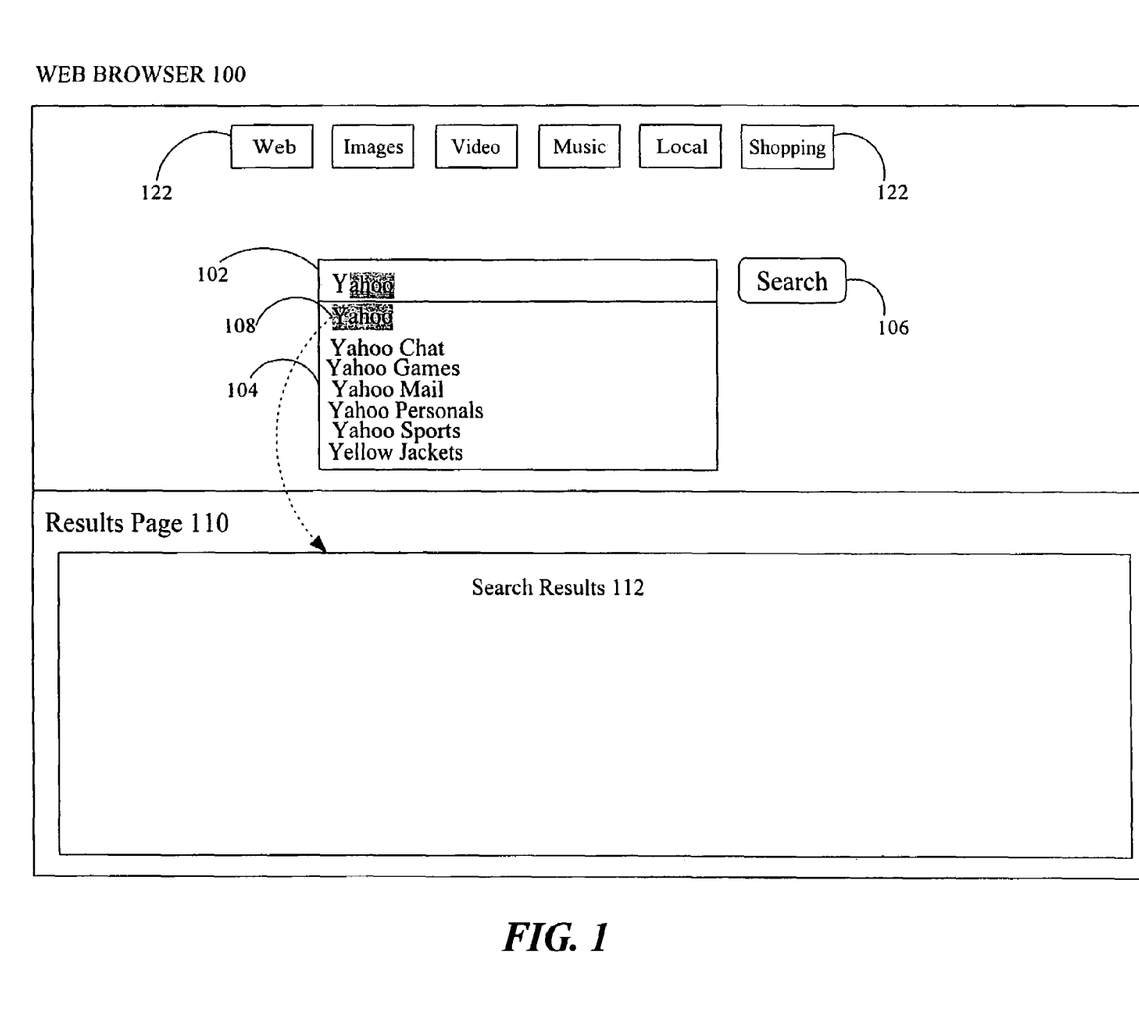
FIG. 1 illustrates a user interface that displays predicted queries based on input entered in a query field, and search results from the most likely predicted query, according to one embodiment of the invention.

FIG. 1 illustrates a user interface display, predicted queries, and search results, according to one embodiment of the invention. A user, via a web browser 100, enters characters, which will constitute the user's intended query, into a query field 102. As soon as the first character is entered, and for every subsequently entered character, that portion of the intended query is sent to a query predictor, described below (also see FIGS. 3A-C). The query predictor determines a set of one or more predicted queries based on the partial query. The predicted queries are sent back to the user and displayed, for example in a drop box 104. The web browser 100 also displays a selected predicted query 108 (hereinafter referred to as the "particular predicted query").

A search engine processes the particular predicted query 108 from the set of predicted queries and sends the search results 112 to the user to be displayed, for example in results page 110. It is thus possible that the user only has to enter one or a few characters before the actual intended query is determined and the results of the intended query are displayed. Therefore, search button 106 may never have to be selected in order for an intended query to be issued.

Query Predictor

In one embodiment of the invention, the portion of the query entered so far by a user is sent from the user's web browser to a query predictor across a network. This may occur for each character, or sequence of characters, entered by the user. The query predictor examines the one or more characters and makes one or more predictions on what the intended query is. The one or more predictions are in the form of one or more completed queries, each of which was a previously issued query. These one or more predictions are sent to and displayed on the user's computer; effectively assisting the user in formulating a query before the user is finished typing the entire intended query in the query field.

The basic assumption behind the query predictor is that it is highly probable that a user intends to issue a query in which at least one other person has issued previously. By using that information, a highly interactive search engine may assist the user in formulating a query, or perhaps aiding the user in refining a query by listing other possible variants of the query that the user would be interested in. Every previously issued query is saved and logged because, if the query was valuable to one user, it has potential value for another user.

In one embodiment, the query predictor extends to other languages and is not exclusive to English. The query predictor may also support other types of strings, such as product names and part numbers where the user may only know a small piece of it.

"Smart" Lexical Completion

The query predictor thus has a searchable database of queries that the query predictor may access once the query predictor has received one or more characters from the user. Based on the partial query, the query predictor determines one or more completed queries from the database of queries that match lexically. However, instead of simply completing the partial query lexically and returning only those queries that begin with the character or characters in the partial query, other queries are also found that contain the lexical completion anywhere in the predicted query. For example, if a user enters the string "th", not only may "theory of evolution" be a predicted query sent to the user, but also "string theory" or "music theory," each of which are not simple lexical completions of "th."

Frequency and Time

In some situations, many previously issued queries may begin with "th." It has been determined that the most useful queries are likely the ones that not only have issued most often (popularity), but also those that have been issued most recently (temporal relevance). Therefore, in one embodiment of the invention, the query predictor biases the resulting set of predicted queries based on their frequency (i.e., number of times the query has issued in the entire query database history), and how often they were issued within a specified time, for instance, within the past week. The fact that the most recently issued queries are biased is based on the premise that a user is more likely to be interested in a subject that many other people are interested in at roughly the same time.

As an example, although "renewable energy sources" may have issued as a query five times more often than "nuclear energy," the partial query "energy" will cause the query predictor to generate "nuclear energy" as the particular predicted query because "nuclear energy" may have been issued much more frequently in the last week due to a hypothetically recent announcement by Congress that 100 nuclear reactors will be constructed.

Figure 2:
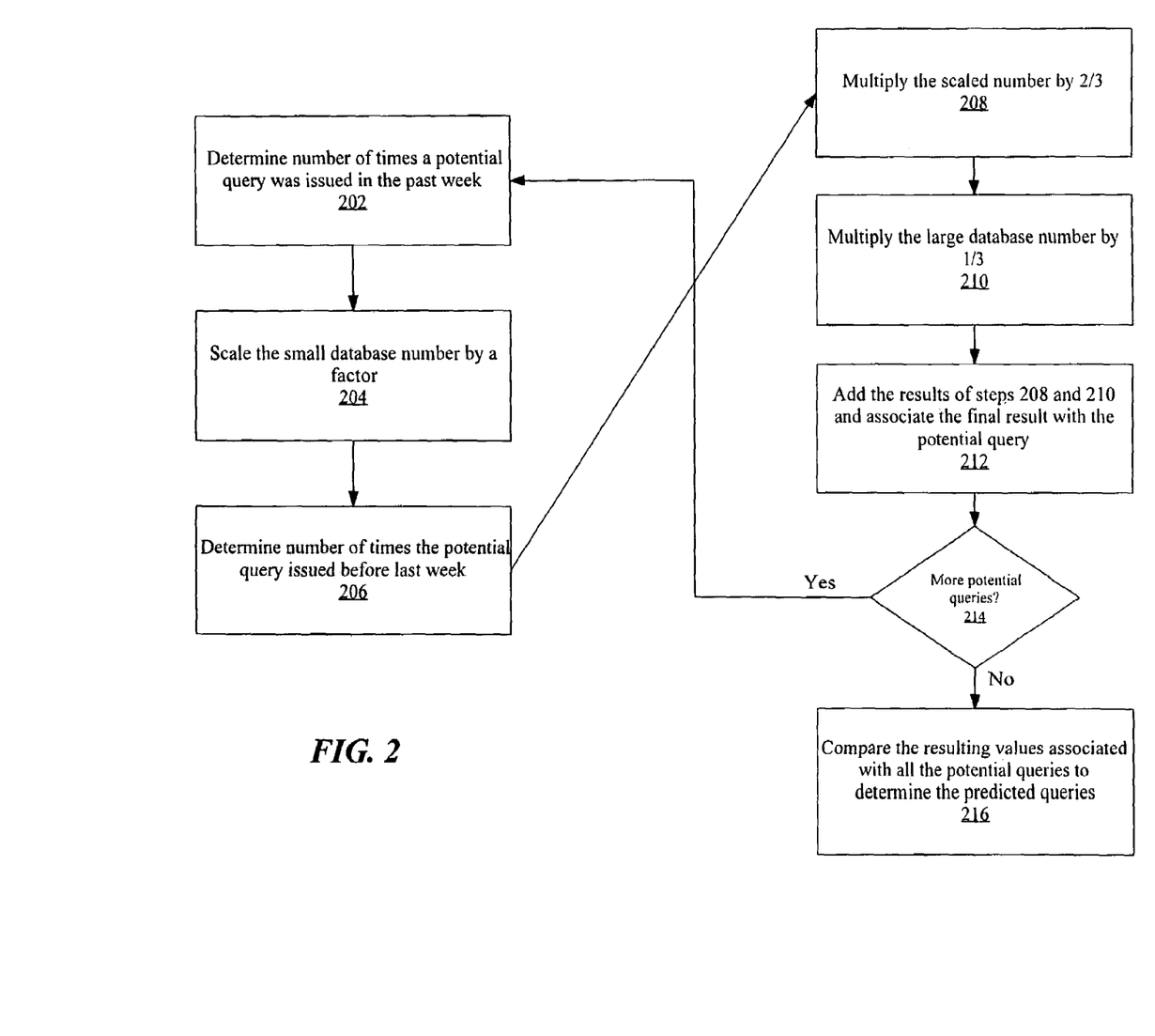
FIG. 2 is a flow diagram that illustrates how temporal relevance is factored into determining which potential queries become predicted queries sent to the user, according to one embodiment of the invention.

In one embodiment, the time component is determined by searching at least two databases, one for relatively recent queries and one for relatively older queries, and then scaling the results from searching the recent database and weighting them accordingly. FIG. 2 illustrates steps in which this embodiment may be implemented. It will be apparent that there are many ways this scaling and weighting may be performed, in addition to the number of "old" query databases and "new" query databases, as the invention is not limited to this particular example. In this embodiment, the query predictor has access to a small database of all queries that issued in the last week and to a large database of all queries that issued before a week ago. When searching the small database for potentially valuable predicted queries, the number of times a potential query is found in the small database is scaled based on a factor. This factor is the ratio of the number of times a moderately popular query is found in the large database to the number of times that same moderately popular query is found in the small database. For example, suppose that "Yahoo" is a moderately popular query over the last week and over the past few years. If "Yahoo" is found in the large database 1.7 million times, and 25 thousand times in the small database, then the factor would be 1.7 million/25 thousand, or 68.

Query prediction would be less effective if a moderately popular query in both the small and large databases were not used to scale. If a query was popular only in the large database and but not in the small database, then the scaling factor would be skewed. For example, if the query "floppy disk" were used as the scaling factor and it was queried many times in the history of the large database but was queried only a few times in the previous week, for the simple reason that no one produces or uses floppy disks anymore, then the ratio between the large and small databases would be enormous. This would skew the results of a partial query by heavily weighting relatively recent queries to the detriment of relatively older, and potentially more valuable, queries.

A similar problem would exist if a new query was used as the scaling factor that was only issued in the past week but rarely issued in the history of the large database. For example, "nuclear energy" may be an infrequently issued query in the past. But, because of a hypothetically recent announcement by Congress that 100 nuclear reactors will be constructed, the query "nuclear energy" will likely be issued thousands, if not hundreds of thousands of times. In that case, the scaling factor would be quite small; and when a query in the small database is weighted against the queries in the large database, then relatively older predicted queries, rather than relatively newer, and potentially more valuable, predicted queries, would most likely be returned to the user.

Therefore, referring to FIG. 2, after the query predictor determines, in step 202, the number of times a given potentially valuable query was issued in the small (i.e. recent) database, the number is scaled, in step 204, by 68, which is based on the scaling factor determined above with "Yahoo" as the scaling query. The resulting scaled value essentially indicates that the potential queries in the small database are equal in weight to the potential queries in the large (i.e. old) database. Subsequently, the query predictor determines, in step 206, the number of times the potential query appears in the large database of "older" queries.

At this point, a weight is applied to the potential queries in the small database versus the potential queries in the large database. This is performed by multiplying the result of the scaled small database number by ⅔ and adding it to the result of multiplying the number of times the potential query was found in the large database by ⅓ (see steps 208-212). Steps 202-212 are performed for each potential query determined by the query predictor. When there are no more potential queries to process (214), all the potential queries are then compared with each other (step 216) based on their respective values determined for each potential query at step 212. The two or more queries (e.g., ten) with the highest values become the predicted queries, which are subsequently sent to the user.

Search Engine

In one embodiment of the invention, the search engine component processes the particular predicted query (i.e. the most likely intended predicted query) that a user would be interested in. The particular predicted query is processed to obtain search results. The search engine that may be used for this purpose is common in the art and requires no further description.

The search results obtained by the search engine are sent to and displayed on the user's computer. If the particular predicted query is the user's intended query, the search results based on the particular predicted query may appear on the user's monitor even before the user enters another character in the query field and very likely before the user finishes entering the full intended query. If the particular predicted query is not the user's intended query, then the user may select a different predicted query in the list or continue typing, at which time a new set of search results, based on the selected or new particular predicted query, will be displayed via the user interface.

Providing Predicted Queries and Search Results

Figure 3A:
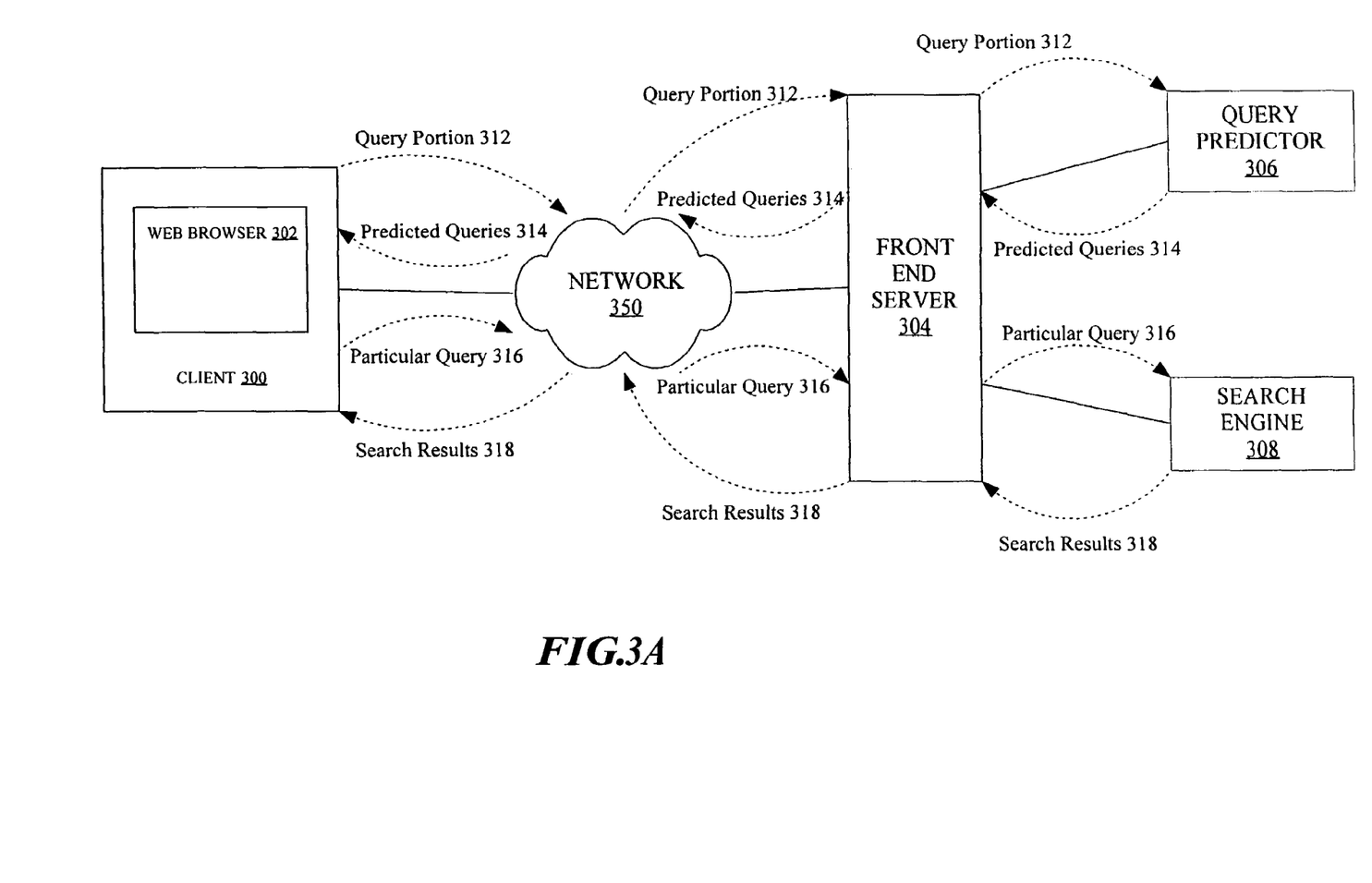
FIG. 3A is a block diagram that illustrates the communication between a web browser on a client and a front end server, according to one embodiment of the invention.

FIG. 3A is a block diagram that illustrates one way a partial query is processed and how the results of the partial query are returned, according to one embodiment of the invention.

A user at a client 300 enters a partial query in a web browser 302. The partial query 312 is sent to a front end server 304 over a network 350. Front end server 304 is not a necessary element in any embodiment of the invention. Its main purpose is to add security to the interactive search engine system. Network 350 is also not a required element in any embodiment, but is merely illustrated to show one approach in which the invention may be implemented. Network 350 may be a local area network (LAN), a wide area network (WAN), or the Internet. Front end server 304 forwards partial query 312 to a query predictor 306, discussed above, which processes the partial query.

Front end server 304, query predictor 306, and a search engine 308, or any combination thereof, may be implemented on the same device. However, for the purpose of illustration and simplification, they each reside on different devices.

Query predictor 306 determines a set of one or more predicted queries based on the partial query and sends them 314 back to front end server 304. Along with the set of predicted queries, query predictor 306 sends additional data indicating which of the predicted queries in the set is the particular predicted query. Either query predictor 306 determines which predicted query is the particular predicted query or web browser 302 is given sufficient information to make that determination. Front end server 304 then forwards the predicted queries 314 and the data indicating the particular predicted query to client 300 over network 350 to be displayed on web browser 302.

Upon receipt of the set of predicted queries, web browser 302 sends particular predicted query 316 over network 350 to front end server 304, which forwards particular predicted query 316 to search engine 308. Search engine 308, described above, processes the particular predicted query to obtain search results. The search results 318 are finally sent to front end server 304, which forwards them 318 to client 300 over network 350.

One advantage of this implementation is that the predicted queries are sent immediately to the user as soon as they are determined. However, this implementation also illustrates the possibility that for every character the user types into the query field of his web browser, there are two complete round trips that a communication has to make between client 300 and front end server 304.

Figure 3B:
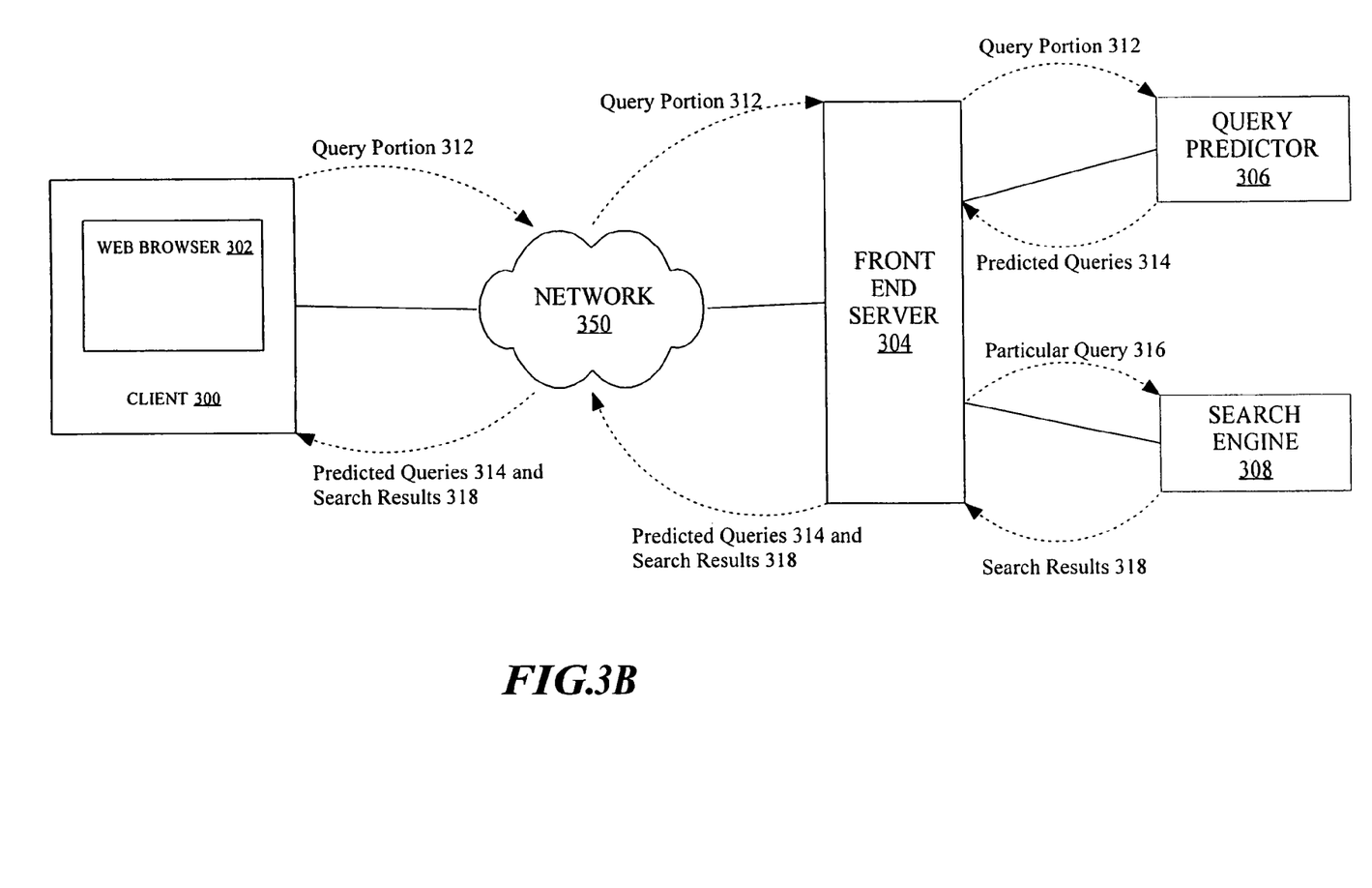
FIG. 3B is a block diagram that illustrates the communication between a web browser on a client and a front end server, according to another embodiment of the invention.

FIG. 3B is a block diagram that illustrates a different way in which a partial query is processed and how the results are returned to the user, according to another embodiment of the invention.

A user at client 300 enters a partial query in a web browser 302. Partial query 312 is sent to front end server 304 over a network 350. Front end server 304 forwards partial query 312 to query predictor 306, which processes the partial query.

Query predictor 306 determines a set of one or more predicted queries based upon the partial query and sends them 314 to front end server 304. Instead of immediately forwarding the predicted queries to client 300, front end server 304 retains the predicted queries and sends search engine 308 the particular predicted query 316. Again, along with the set of predicted queries, query predictor 306 sends additional data indicating which of the predicted queries in the set is the particular predicted query. Either query predictor 306 determines which predicted query is the particular predicted query or front end server 304 is given sufficient information to make that determination.

Search engine 308 processes the particular predicted query to obtain search results. The search results 318 are sent to front end server 304, at which time front end server 304 forwards both predicted queries 314 and search results 318 to client 300 over network 350.

In the absence of front end server 304, query predictor 306 sends the predicted queries 314 and to search engine 308, which subsequently sends the predicted queries 314 and search results 318 to client 300 over network 350.

One advantage of this implementation is that there is less communication (i.e., traffic) between client 300 and front end server 304. However, the predicted queries may not display on the user's web browser 302 as quickly as in the previous embodiment because the predicted queries must "wait" for the search results to be produced and sent to front end server 304 before the predicted queries are forwarded to client 300.

Figure 3C:
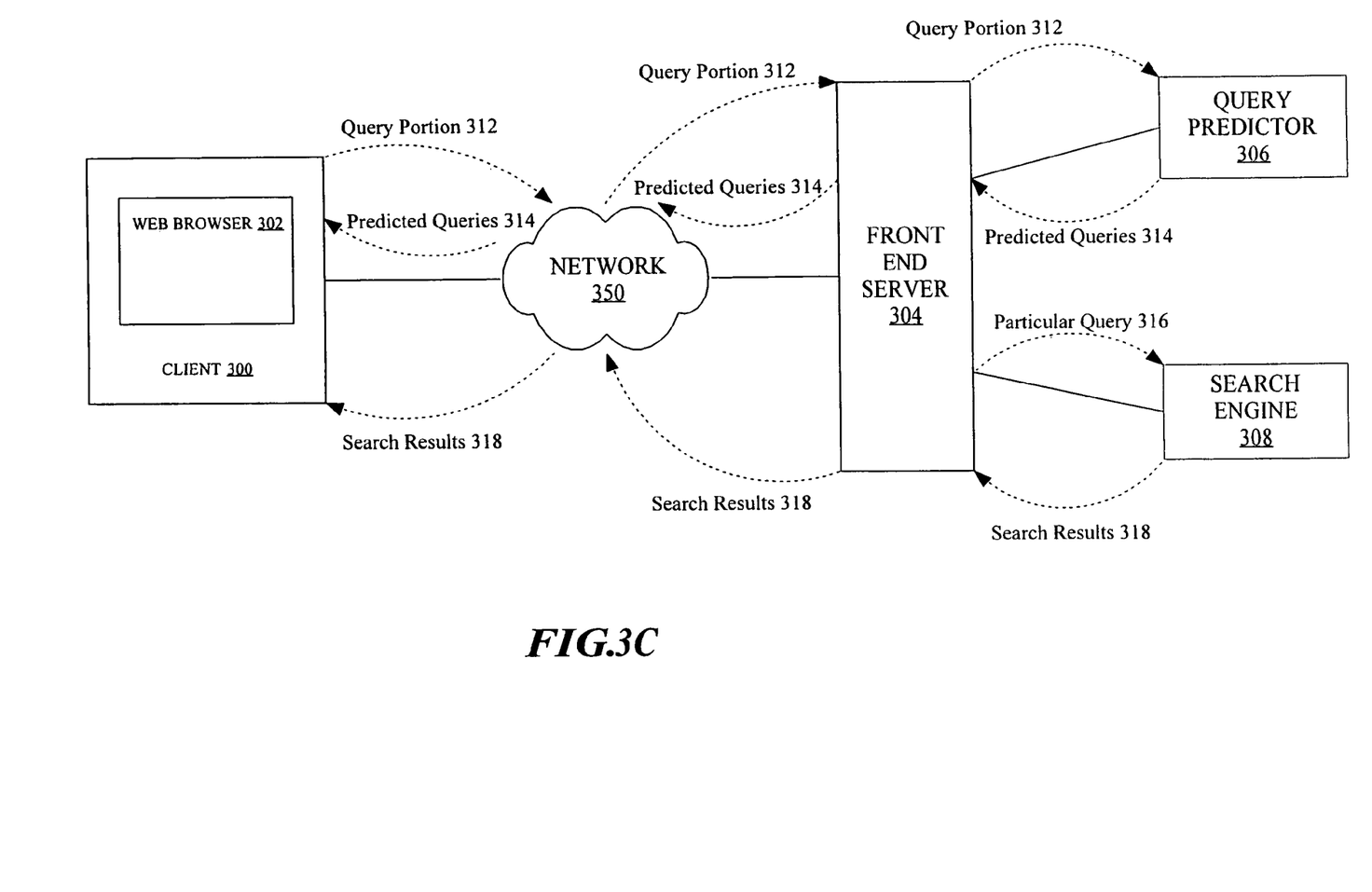
FIG. 3C is a block diagram that illustrates the communication between a web browser on a client and a front end server, according to another embodiment of the invention.

FIG. 3C is a block diagram that illustrates a different way in which a partial query is processed and how the results are returned to the user, according to another embodiment of the invention.

A user at client 300 enters a partial query in a web browser 302. Partial query 312 is sent to front end server 304 over network 350. Front end server 304 forwards the partial query 312 to query predictor 306, which processes the partial query.

Query predictor 306 determines a set of one or more predicted queries based upon the partial query and sends them 314 to front end server 304. Again, along with the set of predicted queries, query predictor 306 sends additional data indicating which of the predicted queries in the set is the particular predicted query. Either query predictor 306 determines which predicted query is the particular predicted query or front end server 304 is given sufficient information to make that determination.

Instead of "holding on" to the predicted queries, as in the last embodiment, front end server 304 sends the predicted queries 314 to client 300 over network 350 and sends particular predicted query 316 to search engine 308 at substantially the same time. It is also possible for query predictor 306 to send the particular predicted query to search engine 308 directly.

Search engine 308 processes the particular predicted query to obtain search results. The search results 318 are sent to front end server 304, at which time front end server 304 forwards search results 318 to client 300 over network 350. In the absence of front end server 304, query predictor 306 sends both the predicted queries 314 and the particular predicted query 316 to search engine 308, after which search engine 308 sends predicted queries 314 and search results 318 to client 300 over network 350.

In the absence of front end server 304, query predictor 306 sends both predicted queries 314 and the particular predicted query 316 to search engine 308, which subsequently sends predicted queries 314 and search results 318 to client 300 over network 350.

The advantage of this implementation compared to the embodiment described in FIG. 3A is that there is less traffic between client 300 and front end server 304. The advantage compared to the embodiment described in FIG. 3B is that the predicted queries do not have to "wait" for the search results to be produced and sent to front end server 304 before the predicted queries are forwarded to client 300. Thus, the predicted queries are sent immediately upon their production and less communication is required between client 300 and front end server 304.

User Interface

In one embodiment of the invention, as illustrated in FIG. 1, the user interface includes at least 1) a query field 102 where a user enters characters that will constitute the partial query, 2) a drop down box 104 that lists the set of one or more predicted queries, 3) a search results page 110, and 4) a "Search" button 106. The search button may be in the form of any mechanism that allows the user to select the query the user enters, in case the user is not satisfied with any of the predicted queries provided by the interactive search engine. The set of predicted queries listed in drop down box 104 may be represented in almost any other type of user interface element, including, but not limited to, a text box, list box, menu, or context menu. The user interface may be viewed using a web browser, such as Internet Explorer or Mozilla Firefox.

In one embodiment, the set of predicted queries are listed, beginning at the top, in order of the most likely predicted query to the least likely predicted query.

Modifications

In addition to the user interface, query predictor, and search engine described above, the interactive search engine may be modified in many ways to alter the look, feel, and responsiveness of the search experience.

Tabs

For instance, the user interface includes tabs, such buttons or links 122 in FIG. 1, wherein the user may select a subsection of possible queries and search based on that subsection. With a collection of tabs or "search verticals," such as "Web," "Images," "Video," and "Shopping," a user may select different query sets. The data for which the query predictor is predicting is different based on what the user is interested in, which data is narrowed by using these tabs. For example, if the user is interested in shopping for a product, the user selects the "Shopping" tab. The user then begins to enter a product name or service in query field 102. The query predictor is not only sent the partial query but also the shopping selection information, indicating that the user is searching for a particular product or service, wherein the query predictor returns only those predicted queries that pertain to products and services.

Keywords

Often when a query is issued, the order of words in the query is unimportant. As alluded to earlier, the issued query does not have to be in English. In other embodiments, not only are other natural languages supported, but also non-natural strings, such as product names and part numbers where the user may only know a portion of the non-natural string. Therefore, the term "word" as used herein may include an English word, a Korean word, or a product number.

When a user enters two or more words in the query field, the user is not necessarily concerned that the search engine returns a link to a web accessible document that contains the two or more words in the order that they were entered. Rather, the user is interested in a web accessible document that merely contains those words, in whatever order they are found.

For example, a user enters "solar wind water power" in the query field. The user does not particularly care about the order. The user is rather interested in queries that contain the words "solar," "wind," "water," and "power" somewhere in the query. The query predictor determines what words are important in the query and which words are not important, and then predicts queries based on the important words instead of predicting queries based simply on a matching substring.

Delay Results

In another embodiment, the step of displaying the predicted queries and/or the search results is delayed. Instead of immediately returning predicted queries, the query predictor "waits" until certain criteria is satisfied (such as the lapse of a specified amount of time or when a few characters are entered, or both) before the predicted queries and search results are displayed. This additional step of waiting assumes that the user may not be sure what he/she wants to query on. Thus, the predicted queries are delayed until the interactive user interface determines, based on the waiting criteria, that this is what the user truly intends to query on. Once the waiting criteria are satisfied, the partial query is processed by the query predictor and the search engine, as described above.

Other Dynamic Data

There are additional ways to aid users other than to predict the intended query and return the appropriate search results. In another embodiment, advertisements that appear on the interactive user interface change based on the particular predicted query returned from the query predictor. Thus, every time the particular predicted query changes, new advertisements that relate to the query are posted on the user interface and advertisements that related to an older and non-relevant query are deleted from the user interface. For instance, if a user types "elli" and the query predictor determines "elliptical" as the particular predicted query, advertisements that relate to exercise equipment will appear on the user interface.

In addition to advertisements, other dynamic information may be useful to the user when submitting a query. In another embodiment, information relating to a particular predicted query but not found in the search results are displayed to the user via the user interface. Extending the "theory" example used above, the query predictor determines that "theory" is the particular predicted query for the partial query "th" entered by the user. The query predictor, or perhaps another program, determines that "theory" is associated with "string theory," "music theory," and "math theory" and returns these related subjects to be displayed in the form of predicted queries or in a different form on the user interface. For short queries like "theory," this additional information happens to be the same set as what the query predictor would produce.

However, if the user entered "interna" in the query field and the query predictor determined that the particular predicted query is "international trade" then the query predictor, in addition to the predicted queries, would return queries that are not lexical completions of "international trade," but rather queries related to the topic of international trade. Such queries could be on GATT, WTO, UN, US trade policies, etc. A program separate from the query predictor could also perform this function.

Clearly, this aspect of the invention is not performing query prediction, but rather is providing the user with dynamic, related, and hopefully helpful information. A principle in providing advertisements, additional queries, and other related information is to keep everything that is displayed via the user interface consistent with what the query predictor "believes" is the user's intent, which the query predictor determines from the partial query.

Implementation Mechanisms

Figure 4:
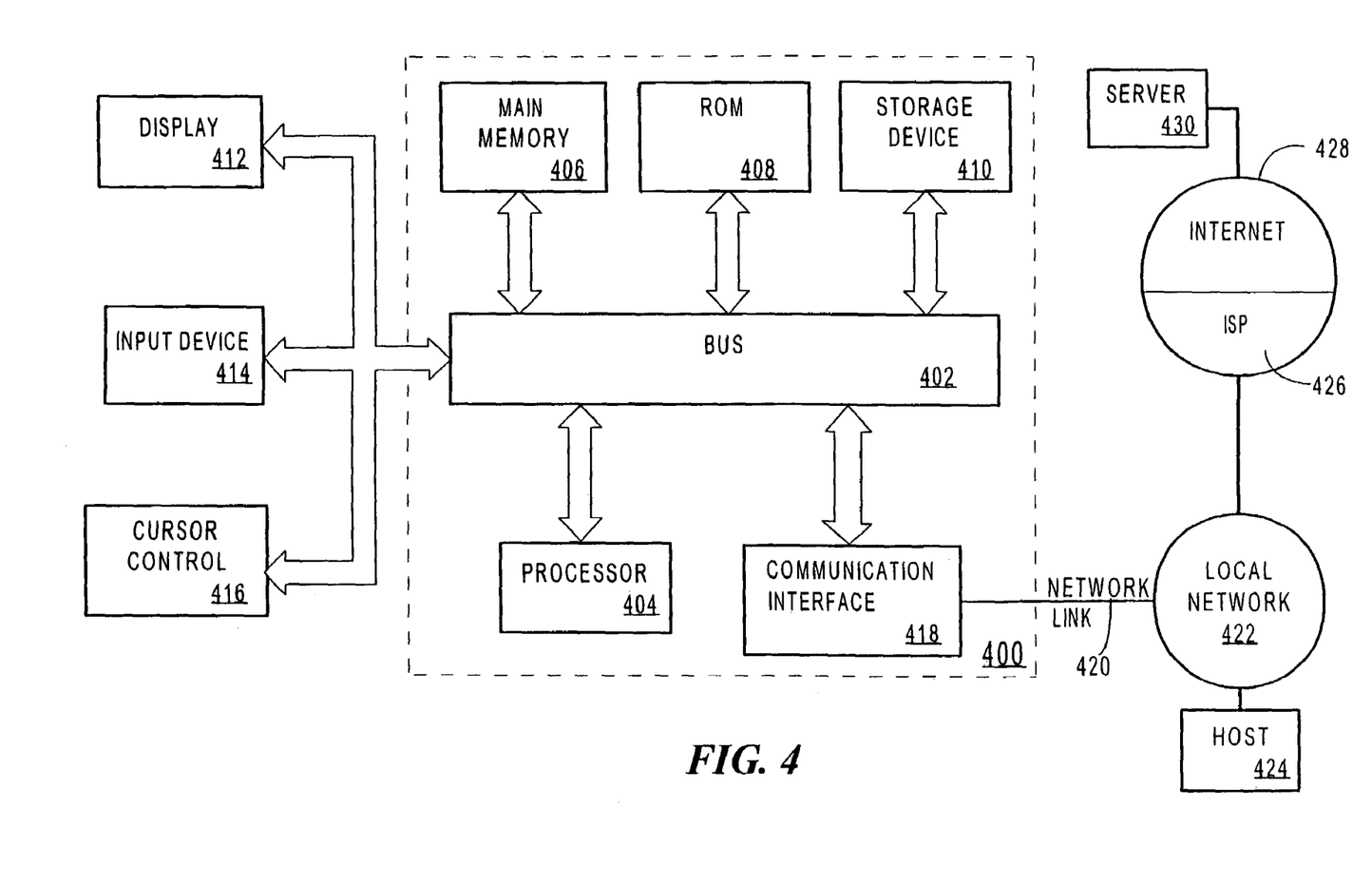
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for processing query data comprising:
   receiving, from a client over a network a portion of a query, wherein the portion of the query is not formerly issued by the user that initiated the query;
   before any predicted queries are provided to the client and in response to receiving the portion of the query determining, based on the portion of the query, a set of one or more predicted queries that correspond to the portion of the query;
   selecting, based upon selection criteria, a particular predicted query from the set of one or more predicted queries;
   processing the particular predicted query to obtain search results; and
   providing both the set of one or more predicted queries and the search results to the client over the network;
   wherein determining the set of one or more predicted queries includes:
   determining a plurality of potential predicted queries;
   for each query of the plurality of potential predicted queries:
   searching a first database to determine a first value that indicates how often said each query was issued during a first period of time;
   searching a second database to determine a second value that indicates how often said each query was issued during a second period of time that occurred temporally before or after the first period of time;
   scaling the first value by a scale factor to generate a scaled value:
   generating a resulting value based on the scaled value and the second value; and
   associating the resulting value with said each query: and
   using the resulting value of each query of the plurality of potential predicted queries to determine the set of one or more queries from the plurality of potential predicted queries.

2. The computer-implemented method as in claim 1, wherein providing the set of one or more predicted queries to the client over the network further comprises:
   sending indication information with the one or more predicted queries based on how often the predicted queries issued in the past,
   wherein the indication information indicates an ordering of the set of one or more predicted queries in which the client may display the predicted queries.

3. The computer-implemented method as in claim 2, wherein sending indication information with the set of one or more predicted queries is also based on when the predicted queries were issued.

4. The computer-implemented method as in claim 1, wherein determining the set of one or more predicted queries that correspond to the portion of the query comprises:
   identifying key words in the portion of the query; and
   determining one or more predicted queries that correspond to the key words.

5. The computer-implemented method as in claim 1, wherein:
   a query predictor determines the set of one or more predicted queries; and
   a search engine processes the particular predicted query to obtain the search results.

6. The computer-implemented method as in claim 5, wherein:
   the particular predicted query is received from the client after the set of one or more predicted queries are provided to the client over the network; and
   the search results are subsequently sent to the client.

7. The computer-implemented method as in claim 5, wherein the set of one or more predicted queries are provided to the client over the network at substantially the same time the particular predicted query is sent to the search engine.

8. The computer-implemented method as in claim 5, wherein:
receiving the portion of the query is performed by a front end server and includes the front end server sending the portion of the query to the query predictor;
the front end server receives the set of one or more predicted queries from the query predictor and sends the particular predicted query to the search engine without sending the set of one or more predicted queries to the client;
the front end server receives the search results from the search engine; and
after receiving the search results from the search engine, the front end server subsequently provides both the set of one or more predicted queries and the search results to the client over the network.

9. The computer-implemented method as in claim 1, further comprising providing to the client additional data, including advertisements, that relates to the search results.

10. The computer-implemented method of claim 1, further comprising:
receiving an indication of a selection of another predicted query in the set of one or more predicted queries; and
providing new search results based on the selection of the selected predicted query.

11. The computer-implemented method of claim 1, comprising the steps of:
receiving from the client over the network the portion of the query and a subsequent portion of the query;
determining a second set of one or more predicted queries that corresponds to the portion of the query and the subsequent portion of the query; and
selecting, based upon selection criteria, a subsequent particular predicted query from the second set of one or more predicted queries,
wherein the subsequent particular predicted query is not processed to obtain search results if the subsequent particular predicted query is the same as the previous particular predicted query.

12. The method of claim 1, wherein the scale factor is a ratio of (a) a number of times a particular query is found in the first database to (b) a number of times said particular query is found in the second database, wherein none of the plurality of potential predicted queries is the particular query.

13. The method of claim 1, wherein:
generating the resulting value based on the scaled value and the second value includes weighting at least one of the scaled value or the second value by a weight factor to generate a second scaled value;
the effect of the weight factor is to give more weight to temporally newer issued queries relative to temporally older issued queries; and
the resulting value is also based on the second scaled value.

14. A machine-readable storage medium storing instructions which, when processed by one or more processors, causes the method of:
receiving, from a client over a network a portion of a query, wherein the portion of the query is not formerly issued by the user that initiated the query;
before any predicted queries are provided to the client and in response to receiving the portion of the query, determining, based on the portion of the query, a set of one or more predicted queries that correspond to the portion of the query;
selecting, based upon selection criteria, a particular predicted query from the one or more predicted queries;
processing the particular predicted query to obtain search results; and
providing both the one or more predicted queries and the search results to the client over the network,
wherein determining the set of one or more predicted Queries includes:
determining a plurality of potential predicted queries;
for each query of the plurality of potential predicted queries:
search a first database to determine a first value that indicates how often said each query was issued during a first period of time;
searching a second database to determine a second value that indicates how often said each query was issued during a second period of time that occurred temporally before or after the first period of time;
scaling the first value by a scale factor to generate a scaled value;
generating a resulting value based on the scaled value and the second value;
and associating the resulting value with said each query; and
using the resulting value of each query of the plurality of potential predicted queries to determine the set of one or more queries from the plurality of potential predicted queries.

15. The machine-readable storage medium of claim 14, wherein providing the set of one or more predicted queries to the client over the network further comprises:
sending indication information with the set of one or more predicted queries based on how often the predicted queries issued in the past,
wherein the indication information indicates an ordering of the set of one or more predicted queries in which the client may display the predicted queries.

16. The machine-readable storage medium of claim 15, wherein sending indication information with the set of one or more predicted queries is also based on when the predicted queries were issued.

17. The machine-readable storage medium of claim 14, wherein determining one or more predicted queries that correspond to the portion of the query comprises:
identifying key words in the portion of the query; and
determining one or more predicted queries that correspond to the key words.

18. The machine-readable storage medium of claim 14, wherein:
a query predictor determines the set of one or more predicted queries; and
a search engine processes the particular predicted query to obtain the search results.

19. The machine-readable storage medium of claim 18, wherein:
the particular predicted query is received from the client after the set of one or more predicted queries are provided to the client over the network; and
the search results are subsequently sent to the client.

20. The machine-readable storage medium of claim 18, wherein the set of one or more predicted queries are provided to the client over the network at substantially the same time the particular predicted query is sent to the search engine.

21. The machine-readable storage medium of claim 18, wherein:
receiving the portion of the query is performed by a front end server and includes the front end server sending the portion of the query to the query predictor;

the front end server receives the set of one or more predicted queries from the query predictor and sends the particular predicted query to the search engine without sending the set of one or more predicted queries to the client;

the front end server receives the search results from the search engine; and after receiving the search results from the search engine, the front end server subsequently provides both the set of one or more predicted queries and the search results to the client over the network.

22. The machine-readable storage medium of claim 14, wherein the instructions, when processed by the one or more processors, further cause the method of providing to the client additional data, including advertisements, that relates to the search results.

23. The machine-readable storage medium of claim 14, wherein the instructions, when processed by the one or more processors, further cause the method of:

receiving an indication of a selection of another predicted query in the set of one or more predicted queries; and providing new search results based on the selection of the selected predicted query.

24. The machine-readable storage medium of claim 14, wherein the instructions, when processed by the one or more processors, further cause the method of:

receiving from the client over the network the portion of the query and a subsequent portion of the query;

determining a second set of one or more predicted queries that corresponds to the portion of the query and the subsequent portion of the query; and selecting, based upon selection criteria, a subsequent particular predicted query from the second set of one or more predicted queries, wherein the subsequent particular predicted query is not processed to obtain search results if the subsequent particular predicted query is the same as the previous particular predicted query.

25. The machine-readable storage medium of claim 14, wherein the scale factor is a ratio of (a) a number of times said each query is found in the first database to (b) a number of times said each query is found in the second database, wherein none of the plurality of potential predicted queries is the particular query.

26. The machine-readable storage medium of claim 14, wherein:

generating the resulting value based on the scaled value and the second value includes weighting at least one of the scaled value or the second value by a weight factor to generate a second scaled value;

the effect of the weight factor is to give more weight to temporally newer issued queries relative to temporally older issued queries; and the resulting value is also based on the second scaled value.

* * * * *